(12) United States Patent
Scappatura et al.

(10) Patent No.: US 11,005,361 B2
(45) Date of Patent: May 11, 2021

(54) CONTROL CIRCUIT AND METHOD OF A SWITCHING POWER SUPPLY

(71) Applicant: STMicroelectronics S.r.l., Agrate Brianza (IT)

(72) Inventors: Giuseppe Scappatura, Aosta (IT); Alberto Bianco, Gressan (IT); Francesco Ciappa, Borgofranco D'Ivrea (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 16/445,818

(22) Filed: Jun. 19, 2019

(65) Prior Publication Data
US 2020/0403497 A1    Dec. 24, 2020

(51) Int. Cl.
| | |
|---|---|
| *H02M 1/42* | (2007.01) |
| *H02M 1/08* | (2006.01) |
| *H02M 3/335* | (2006.01) |
| *H02M 1/00* | (2006.01) |

(52) U.S. Cl.
CPC ......... *H02M 1/4208* (2013.01); *H02M 1/083* (2013.01); *H02M 3/335* (2013.01); *H02M 2001/0058* (2013.01)

(58) Field of Classification Search
CPC .... H02M 1/4208; H02M 1/083; H02M 3/335; H02M 2001/0058
See application file for complete search history.

(56) References Cited

U.S. PATENT DOCUMENTS

| | | | |
|---|---|---|---|
| 8,599,579 B2 | 12/2013 | Kuebrich et al. | |
| 9,083,250 B2 | 7/2015 | Adragna | |
| 9,154,030 B2 | 10/2015 | Bianco et al. | |
| 9,263,955 B2 * | 2/2016 | Schmid | H02M 1/08 |
| 9,461,558 B2 | 10/2016 | Bianco et al. | |
| 9,467,045 B2 | 10/2016 | Fogg et al. | |
| 9,472,298 B1 * | 10/2016 | Louie | G11C 16/28 |
| 10,186,964 B1 * | 1/2019 | Hanschke | H02M 3/157 |
| 10,218,284 B1 * | 2/2019 | Soleno | H02M 3/3353 |
| 10,224,828 B1 * | 3/2019 | Sigamani | H02M 3/3353 |
| 2009/0086513 A1 * | 4/2009 | Lombardo | H02M 3/33507 363/21.12 |

(Continued)

OTHER PUBLICATIONS

W. Langeslag et al. "A High-Voltage Compatible BCD SoC-ASIC Performing Valley-Switching Control of AC-DC Power Converters Based on PFC and Flyback Cells", Nov. 6-10, 2006, IECON 2006, 32nd Annual Conference, pp. 2996-3001. (Year: 2006).*

(Continued)

*Primary Examiner* — Fred E Finch, III
*Assistant Examiner* — Kevin H Sprenger
(74) *Attorney, Agent, or Firm* — Seed Intellectual Property Law Group LLP (57) ABSTRACT

A control circuit is configured to control a power factor correction (PFC) pre-regulator including a power switch and being configured to operate in a transition mode of operation and a valley-skipping mode of operation. The control circuit generates a drive signal to control a switching of the power switch based on a current threshold. A current threshold generator in the control circuit is configured to modulate the current threshold as a function of a number of valleys skipped in the valley-skipping mode of operation.

20 Claims, 7 Drawing Sheets

(56) References Cited

U.S. PATENT DOCUMENTS

| | | |
|---|---|---|
| 2011/0317459 A1 | 12/2011 | Kuebrich et al. |
| 2012/0008350 A1* | 1/2012 | Kuebrich ............... H02M 1/12 363/89 |
| 2013/0121049 A1* | 5/2013 | Shi .................... H02M 3/33507 363/89 |
| 2017/0047846 A1* | 2/2017 | Teo .................. H02M 3/33507 |
| 2017/0324345 A1* | 11/2017 | Stuler ..................... H02M 1/08 |
| 2018/0083538 A1* | 3/2018 | Kong ............... H02M 3/33523 |
| 2018/0153013 A1* | 5/2018 | Halim ................... H05B 45/37 |

OTHER PUBLICATIONS

Bianco et al., "Enhanced Constant-On-Time Control for DCM/CCM Boundary Boost PFC Pre-regulators: Implementation and Performance Evaluation," IEEE Applied Power Electronics Conference and Exposition—APEC 2014, Mar. 16-20, 2014, Fort Worth, TX, pp. 69-75.

Jiang et al., "Light Load THD and Efficiency Optimization of Digitally Controlled PFC Converter With Integrated Valley Switching Control," Application Report, SPRACH7, Nov. 2018, Texas Instruments, 16 pages.

\* cited by examiner

CONTROL CIRCUIT AND METHOD OF A SWITCHING POWER SUPPLY

BACKGROUND

Technical Field

The present disclosure relates to a control circuit of a switching power supply.

Description of the Related Art

It is generally known to use devices for actively correcting the power factor, referred to as power factor correction (PFC), of switching power supplies used in electronic apparatuses of common use such as computers, televisions, monitors, etc. and for supplying power to fluorescent lamps, i.e., switching pre-regulator which absorb a current from a power line, the current being quasi-sinusoidal and in phase with the supply voltage. A switching power supply of this type thus includes a PFC circuit and a DC-DC converter connected to an output of the PFC circuit.

A typical switching power supply includes a DC-DC converter and an input stage or circuit, typically the PFC circuit, connected to the power distribution line. The PFC circuit includes a full-wave diode rectifier bridge and a capacitor connected downstream so as to produce a non-regulated direct voltage from the sinusoidal alternating supply voltage. The capacitor has a large enough capacitance that a relatively small ripple is present at its terminals as compared to a direct or constant voltage level. Therefore, the diodes of the rectifier bridge will only conduct over a short portion of each half cycle of the supply voltage since the instantaneous value of the supply voltage is less than the voltage of the capacitor over most of each half cycle of the supply voltage. The result is current absorbed from the power line consists of a series of short impulses, each such current impulse having an amplitude that is about 5-10 times a resulting average input current value.

This has significant consequences. First, the current absorbed from the power line has peak and RMS (root-mean-square) values much higher than for the case of sinusoidal current absorption. The supply voltage on the power line is, as a result, distorted due to the almost simultaneous impulse absorption of all utilities connected to the power line. In addition, the current in a neutral conductor in the case of three-phase power systems is greatly increased, and there is a low usage of the potential energy or power being supplied by the power system. In fact, the waveform of the impulse current formed by the series of current impulses includes many odd harmonics, which although such harmonics do not contribute to the power provided to the load, contribute to increasing the RMS current absorbed from the power line and therefore to increasing the energy dissipation on the power line.

In quantitative terms, this may all be expressed both in terms of Power Factor (PF), which is a ratio of the real power (the one the power supply sends to the load plus the one dissipated therein in the form of heat) to the apparent power (the product of the RMS voltage by the RMS current absorbed), and in terms of Total Harmonic Distortion (THD), generally intended as percentage ratio of the energy associated with all larger harmonics to the one associated with the fundamental harmonic. Typically, a power supply with capacitance filter has a PF between 0.4 and 0.6 and a THD higher than 100%. The PFC circuit, which is referred to as a PFC pre-regulator herein, is arranged between the rectifier bridge and an input of the DC-DC converter to allow a quasi-sinusoidal current in phase with the supply voltage to be absorbed from the power supply line, thus making the PF close to 1 and decreasing the THD.

Figure 1:
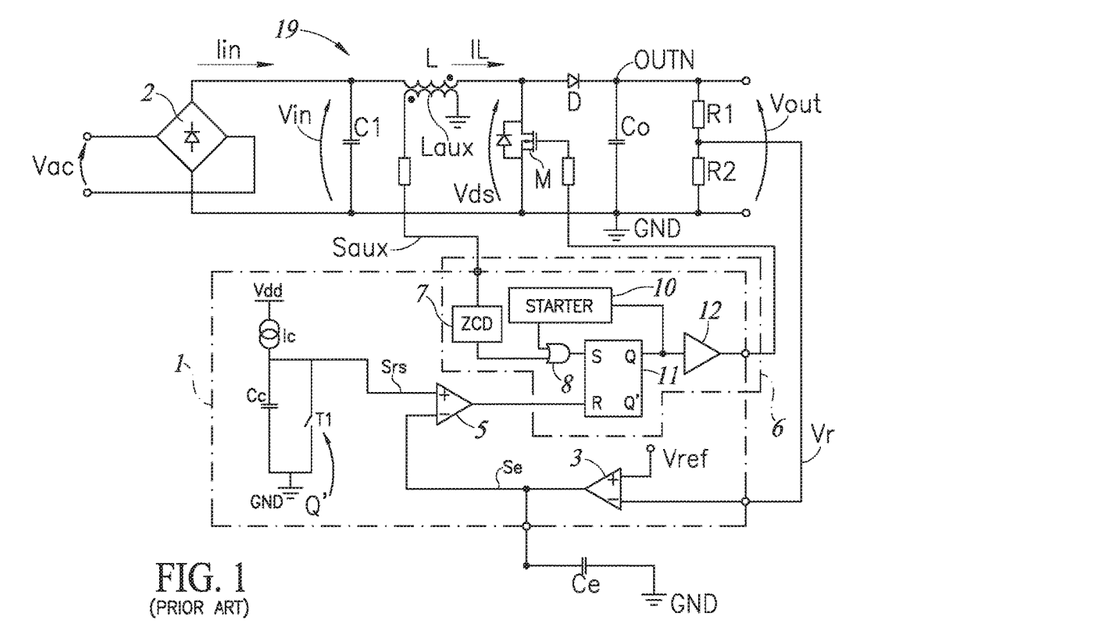
FIG. 1 shows a controller or control circuit of a switching power supply in accordance with the known art.

FIG. 1 schematically shows a PFC pre-regulator including a boost converter 19 and a pulse width modulation (PWM) controller or control circuit 1. The PWM control circuit 1 has a variable frequency, also called "Transition Mode" (TM), as the device works on the borderline between the continuous conduction mode (CCM) and discontinuous conduction mode (DCM) of operation, where each of these modes refers to the characteristics of a current $I_L$ through an inductor L of the booster converter 19. In particular, the control circuit 1 is of the constant on time (COT) type, where the on-time is designated TON and corresponds to the turn-on period of power transistor M each switching cycle of the boost converter 19. According to the COT method of control, the turn-on period or time TON of the power transistor M is used as a control variable and, during each cycle of an alternating input supply voltage Vac, the turn-on time is kept constant at the appropriate value to obtain the desired regulation of an output voltage Vout generated by the boost converter 19 through a feedback control loop as illustrated in FIG. 1. The boost topology is the most common topology for PFC pre-regulator, and is accordingly described by way of example herein.

The boost converter 19 includes a full-wave diode rectifier bridge 2 receiving the input supply voltage Vac, an input capacitor C1, which serves as a high frequency filter, having one terminal connected to the diode bridge 2 and another terminal connected to a reference voltage node, which is designated ground GND in FIG. 1. A voltage Vin is supplied across the input capacitor C1. The inductor L is connected to one terminal of the input capacitor C1 and the MOS power transistor M has a drain terminal connected to one terminal of the inductor L downstream of the inductance as shown in FIG. 1, and having a source terminal connected to ground GND. A boost diode D has an anode connected to the common terminal of the inductor L and the transistor M, and a cathode connected to a boost or output node OUTN having an output capacitor Co connected between the output node and ground GND. The boost converter 19 generates an output voltage Vout, which is a DC voltage, across the output capacitor Co. The magnitude of the output voltage Vout is higher than a peak of the supply voltage Vin, typically 400 V for systems powered by a European power line or universal power line. The output voltage Vout will be provided as an input voltage of a DC-DC converter (not shown in FIG. 1) connected to the PFC pre-regulator.

The control circuit 1 should keep the output voltage Vout at a constant value through a feedback control loop. The control circuit 1 includes an operational error amplifier 3 adapted to compare a divided value of the output voltage Vout, i.e., the voltage Vr given by Vr=R2×Vout/(R2+R1) (where the resistances R1 and R2 are connected in series with each other and in parallel with the output capacitor Co. The error amplifier 3 receives a reference voltage Vref, e.g., of the value of 2.5 V, on one input and generates an output error signal Se across a capacitor Ce connected between an output of the error amplifier 3 and ground GND.

The error signal Se is provided to an inverting input of a PWM comparator 5 while a signal Srs is supplied at a non-inverting input of the PWM comparator. The signal Srs is a voltage ramp generated across a capacitor Cc powered by a current generator Ic in time periods when a switch T1 coupled across the capacitor Cc is open, which coincides with time periods when the power transistor M is turned ON.

The ramp signal Srs controls the duration TON for which the power transistor M is turned ON. When the signals Srs and Se at the inputs of the PWM comparator 5 are equal, the PWM comparator provides a signal to a control circuit or block 6 that is adapted to control the activation and deactivation of the power transistor M, and which, in this case, turns OFF the power transistor.

The control block 6 includes a zero current detecting (ZCD) block 7 having an input that receives an auxiliary signal Saux provided by an inductor Laux magnetically coupled with the inductor L. The signal Saux is representative of the demagnetization of a core of transformer formed by the inductors L and Laux as depicted in FIG. 1. The ZCD block 7 provides a pulse signal to one input of an OR gate 8, the other input of which is connected to a starter circuit 10 that provides an active signal to the OR gate 8 at an initial power-up instant of time of the boost converter 19. The OR gate 8 provides an output signal S to a set input S of a set-reset (SR) flip-flop 11 having a reset input R provided by the comparator 5. The SR flip-flop generates an output signal Q and a negated output signal Q', which is opposite or complementary of the signal Q. The signal Q is provided to an input of a driver 12 which provides a drive signal in response to the signal Q to control the turn ON and turn OFF of the power transistor M. Thus, the driver 12 generates the drive signal to control turn ON and OFF of the switch M in response to the signal Q, with the drive signal being active to control the duration of the turn-on time period TON of the power switch M, and the drive signal being inactive during a turn-off time period TOFF in each switching cycle Tsw of the boost converter 19. The signal Q' generated by the SR flip-flop 11 controls the closing and opening of the switch T1 coupled across the capacitor Cc. When the signal Q is active to turn ON the power switch M, the signal Q' is inactive and the switch T1 is open, allowing the current generator to provide the current Ic to charge the capacitor Cc and generate the voltage Srs across this capacitor. In contrast, when the signal Q is inactive to turn OFF the power switch M, the signal Q' is active, closing the switch T1 and driving the non-inverting input of the PWM comparator 5 to ground GND to prevent the PWM comparator from providing the reset signal to reset the SR flip-flop 11.

Figure 2A:
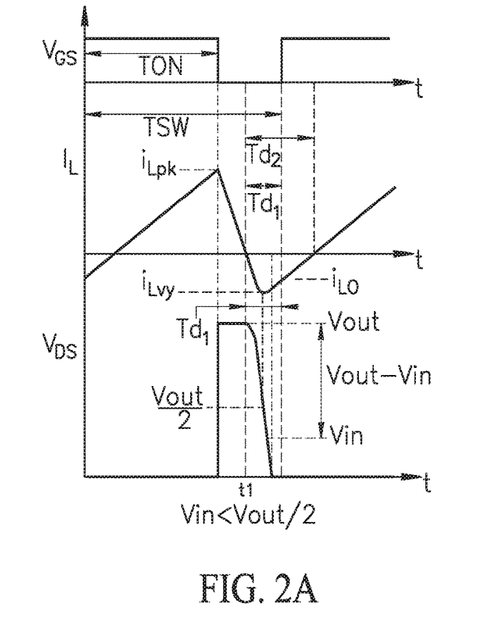
FIGS. 2A and 2B are timing diagrams showing some of the signals generated during operation of the circuit of FIG. 1.
Figure 2B:
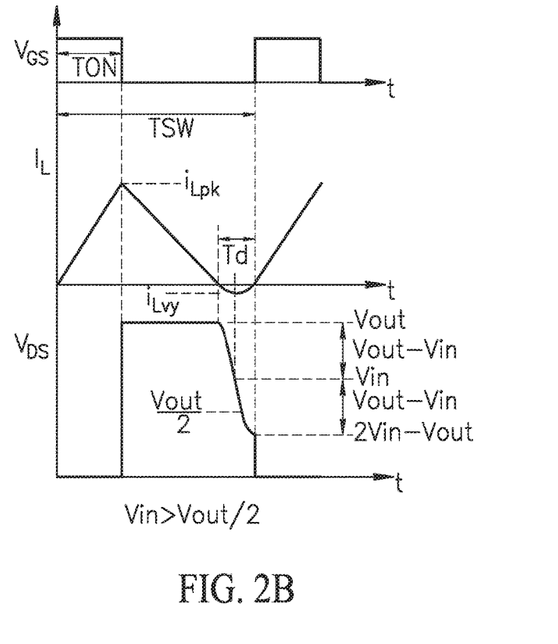

FIGS. 2A and 2B are timing diagrams showing some of the signals generated in the boost converter 19 of FIG. 1 during operation. More specifically, each of the FIGS. 2A and 2B shows a voltage Vgs between the gate and source terminals of transistor M, which corresponds to a gate drive voltage provided by the driver 12 to the transistor M as discussed above with reference to FIG. 1. Also shown is a drain-to-source voltage Vds between the drain and source terminals of the power transistor M Vds, and a current $I_L$ through the inductor L.

The booster converter 19 is typically controlled to operate at a variable switching cycle or frequency, which is typically referred to as transition mode TM mode of operation in which the boost converter operates at a borderline between a continuous conduction mode CCM and discontinuous conduction mode DCM of operation. The terms "continuous" and "discontinuous" refer to the current $I_L$ through the inductor L in the PFC pre-regulator, as will be understood by those skilled in the art. Moreover, in the transition mode TM of operation, the boost converter 19 is typically controlled through constant on time COT control in which a turn-on time TON of the power transistor M is kept constant. In COT control, the turn-on time TON of the power transistor is used as a control variable and, during each cycle of an input supply voltage, the turn-on time TON is kept constant at the appropriate value to obtain, through a feedback control loop, the desired regulation of an output voltage generated by the PFC pre-regulator. In the transition mode TM of operation, the operation of the PFC pre-regulator is never exactly at the borderline between DCM and CCM modes of operation, but operates slightly in the DCM mode of operation, as will also be appreciated by those skilled in the art.

In fact, the transistor M is not turned ON, typically, when the current of the inductor L is at zero, as seen for the inductor current $I_L$ and voltage Vds at a time t1 in FIG. 2A. The voltage Vds at time t1 when the inductor current $I_L$ reaches zero is still equal to the output voltage Vout (typically 400 V). A parasitic capacitance Cd associated with the drain terminal of the power transistor M and diode D at this moment has a stored energy equal to $\frac{1}{2} \cdot Cd \cdot Vout^2$, which needs to be discharged and would be dissipated in a resistance $R_{DS(on)}$ of the transistor M if the transistor were turned ON at time t1. Instead, the turn ON of the transistor M is delayed until after the voltage Vds is reduced. An oscillation of the voltage Vds results from the current $I_L$ and the resonant circuit formed by the inductor L and parasitic capacitance Cd of the transistor M. If the turning ON of the inductor L is delayed until the voltage Vds has a reduced value, the power stored in the parasitic capacitance Cd and dissipated in the transistor M when turned ON is considerably reduced.

The zero current detection ZCD circuit 7 in the control block 6 allows delay of the turning ON of the transistor M so that the transistor is turned ON at a valley ("valley switching") of the voltage Vds across the transistor. This delay is indicated as a delay $Td_1$ in FIG. 2A and a delay Td in FIG. 2B, and is approximately equal to half the period of the oscillating signal Vds across the transistor M. In FIG. 2A, the current $I_L$ becomes positive at a time $Td_2$, where $Td_2 > Td_1$, and there is therefore a time interval $(Td_2 - Td_1)$ in which the transistor M is turned ON but the current $I_L$ of the inductor L is negative, as seen in FIG. 2A.

FIGS. 1, 2A and 2B illustrate constant on time (COT) control, with various techniques such as valley skipping being used with such control to improve performance, as will be appreciated by those skilled in the art. Some of these techniques may improve performance in terms of losses, but may adversely affect performance in other ways, such as THD. Valley switching, for example, ignores or skips valleys (i.e., valley skipping) of the oscillating signal Vds before turning ON the transistor M. This valley skipping results in delaying the turn ON of the transistor M and can reduce switching losses, but affects the input current drawn from the supply line in a way that is not proportional to the input voltage, which can increase the THD of the PFC pre-regulator. There is a continuing need for improved control methods and circuits for PFC circuits and switching power supplies.

BRIEF SUMMARY

In one embodiment, a control circuit is configured to control a power factor correction (PFC) pre-regulator including a power switch and being configured to operate in a transition mode of operation and a valley-skipping mode of operation. The control circuit generates a drive signal to control a switching of the power switch based on a current threshold. A current threshold generator in the control circuit is configured to modulate the current threshold as a function of a number of valleys skipped in the valley-skipping mode of operation.

In embodiments of the control circuit, the transition mode of operation is an enhanced constant on time control of the PFC pre-regulator. The number of valleys skipped in the valley-skipping mode of operation may be one of one valley skipping, two valley skipping, and three valley skipping. In other embodiments, the number of valleys skipped include operation based on additional valleys being skipped, and thus may also include operation based on four or more valley skipping. The PFC pre-regulator has a boost topology in some embodiments, and the power switch is a MOS power transistor in some embodiments of the present disclosure. The control circuit may further include pulse width modulation circuitry configured to control the turning off of the power switch.

In embodiments of the present disclosure, the PFC pre-regulator is configured to receive an alternating input supply voltage and the control circuit further includes a slice generator configured to divide a half cycle of the input supply voltage into equal slices of time and to assign a number to each of the slices of time. The current threshold generator receives the number of a current slice of time from the slice generator and is further configured to modulate the current threshold based on the number of the current slice of time.

The control circuit further includes a finite state machine configured to generate the drive signal to control turning off and turning on of the power switch in embodiments of the present disclosure.

In some embodiments, the PFC pre-regulator includes an inductive element coupled to the power switch and the control circuit includes a current sensing comparator including a first input coupled to a current sense node to receive a current sense signal indicating a current through the inductive element and a second input coupled to the current threshold generator to receive the current threshold. A zero current detection node is configured to provide a signal indicating a zero current condition of the current through the inductive element. The current threshold generator includes a diode having a cathode coupled to the zero current detection node and a plurality of switches and a plurality of resistors. Each of the plurality of switches is coupled in series with a respective one of the plurality of resistors between an anode of the diode and the current sense node, with one of the plurality of switches being activated based on the number of valleys skipped.

In other embodiments of the present disclosure, the PFC pre-regulator includes an inductive element coupled to the power switch and the control circuit includes a current sensing comparator including a first input coupled to a current sense node to receive a current sense signal indicating a current through the inductive element and including a second input coupled to the current threshold generator to receive the current threshold. The current threshold generator includes a plurality of current threshold voltage nodes, each current threshold voltage node configured to receive a respective current threshold voltage. The current threshold generator further includes a plurality of switches, each of the plurality of switches coupled between a corresponding one of the plurality of current threshold voltage nodes and the second input, one of the plurality of switches being activated based on the number of valleys skipped.

BRIEF DESCRIPTION OF THE SEVERAL VIEWS OF THE DRAWINGS

The features and advantages of the disclosed embodiments will become apparent from the following detailed description, illustrated only by way of non-limitative examples in the annexed drawings, in which.

DETAILED DESCRIPTION

Embodiments of the present disclosure are directed to a power factor correction (PFC) control circuit or controller configured to control a boost PFC pre-regulator in multi-mode operation to provide reduced total harmonic distortion (THD), as will be described in more detail in the following description. The term "multi-mode operation" refers to transition mode TM of operation in combination with valley-skipping mode of operation, each of which will be described in more detail below. There are a variety of techniques of controlling PFC pre-regulators in transition mode to reduce the total harmonic distortion, such as described in U.S. Pat. Nos. 9,154,030 and 9,461,558, each of which is incorporated herein by reference in its entirety to the extent not inconsistent with the specific teachings and definitions set forth herein. Valley-skipping mode of operation, however, reduces the input current Iin drawn from the power line through a relation that is not proportional to the input voltage Vac on the power line, which increases the THD of the PFC pre-regulator. This non-proportional relationship between the input current Iin drawn from the power line and the input voltage Vac has a significant impact around the zero-voltage crossing of the input voltage, resulting in a high crossing distortion and thereby an unacceptably large THD of the PFC pre-regulator. Embodiments of the present disclosure allow PFC pre-regulators to operate in transition mode TM along with valley skipping while having an acceptable level of THD, as will be described in more detail in the following description.

Before describing the multi-mode operation of PFC pre-regulators according to embodiments of the present disclosure, the transition mode TM of operation and the valley-skipping mode of operation will again each briefly described in more detail. The transition mode TM of operation was discussed above with reference FIGS. 2A and 2B and is widely used for boost PFC pre-regulators. In the TM mode, each switching cycle of the PFC pre-regulator the power transistor M (FIG. 1) is turned ON for a time determined by a control loop, which can be implemented in a variety of different ways, one of which is depicted generally in FIG. 1. After the turn-on time TON of the power transistor M, the transistor M is turned OFF until the current through in the inductor L reaches zero. The LC resonant circuit formed by the inductor L and the parasitic capacitance Cd of the power transistor M and parasitic capacitance of the diode D on the node OUTN, results in a resonance of the voltage Vds on the node OUTN as discussed above, and which ends at (2*Vin+Vout), or zero volts if this value is less than zero. If the power transistor M is turned ON at this moment, or more specifically after a given delay as discussed above in relation to FIGS. 2A and 2B, the PFC pre-regulator operates near zero volt switching (ZVS) and zero current switching, resulting in high efficiency of the PFC pre-regulator, as will be appreciated by those skilled in the art.

Figure 3:
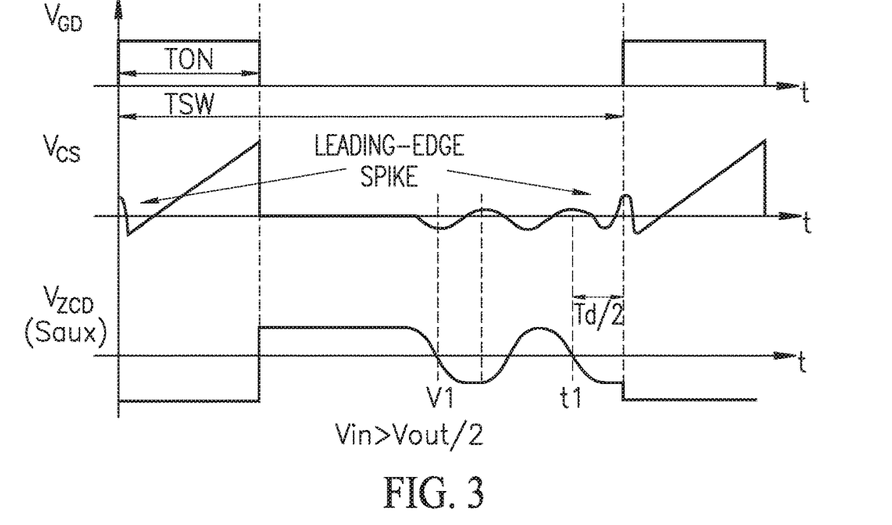
FIG. 3 is a signal timing diagram illustrating valley skipping operation of a PFC pre-regulator.

Referring to FIG. 3, a signal timing diagram illustrates valley skipping operation of a PFC pre-regulator. Valley skipping mode of operation is an extension of transition mode TM of operation, except in valley skipping the power transistor M is not turned ON after the first resonance but after a several number of resonance cycles (1, 2 or 3 for example) of a zero current detection voltage signal $V_{ZCD}$. Turning on the MOS at 2*Vin+Vout, or 0 (if this value is lower than zero) allows maintaining zero voltage switching ZVS and zero current switching ZCS. This mode is frequently used in order to increase efficiency at medium and low load. In particular, this mode allows limiting the switching frequency of the PFC pre-regulator. For example, the multi-mode control could change the mode from transition mode TM to one valley skipping if the switching frequency is above a maximum frequency, and change from one valley skipping to two valley skipping, and so on. FIG. 3 illustrates the zero current detection voltage signal $V_{ZCD}$, which corresponds to the auxiliary signal Saux of FIG. 1, which oscillates as the current $I_L$ through the inductor L oscillates. Moreover, FIG. 3 shows one valley skipping in that an initial valley V1 of the $V_{ZCD}$ signal is "skipped" and a gate drive signal VGD, which corresponds to VGS of FIGS. 2A and 2B, is not activate in response to this valley to turn ON the power transistor M. Instead, the power switch M is turned ON a delay time Td/2 after the end of the first oscillation period of the $V_{ZCD}$ signal.

Figure 4A:
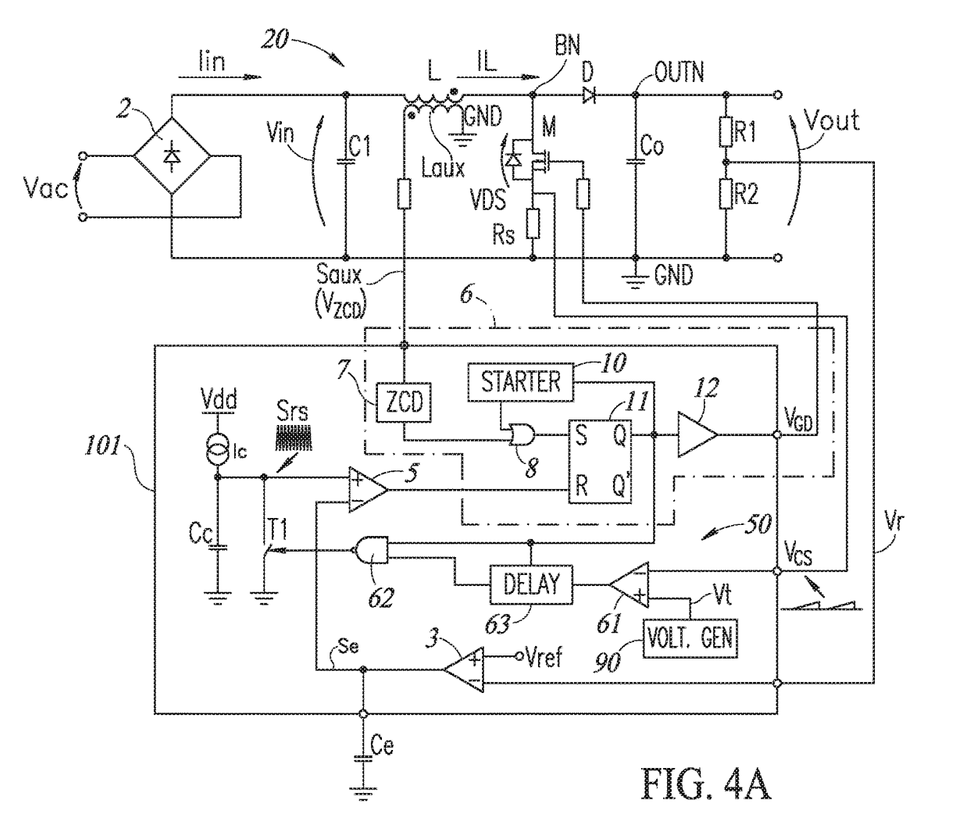
FIG. 4A is a schematic of a PFC pre-regulator that implements enhanced constant on time control to compensate for a negative current resulting from the resonance of the drain-to-source voltage of the power transistor as described with reference to FIGS. 1, 2A, 2B and 3.

Embodiments of the present disclosure may be utilized in combination with an enhanced constant on time (eCOT) control algorithm or control loop of a boost PFC pre-regulator, although embodiments of the present disclosure are not limited to being used with the eCOT control algorithm. Accordingly, the eCOT control algorithm will first be described in more detail with reference to FIGS. 4A, 4B and 5 before describing embodiments of the present disclosure. FIG. 4A is a schematic of a PFC pre-regulator 20 that implements enhanced constant on time (eCOT) control or compensate for a negative current resulting from the resonance of the drain-to-source voltage Vds of the power transistor M as previously discussed above with reference to FIGS. 1, 2A, 2B and 3.

Figure 4B:
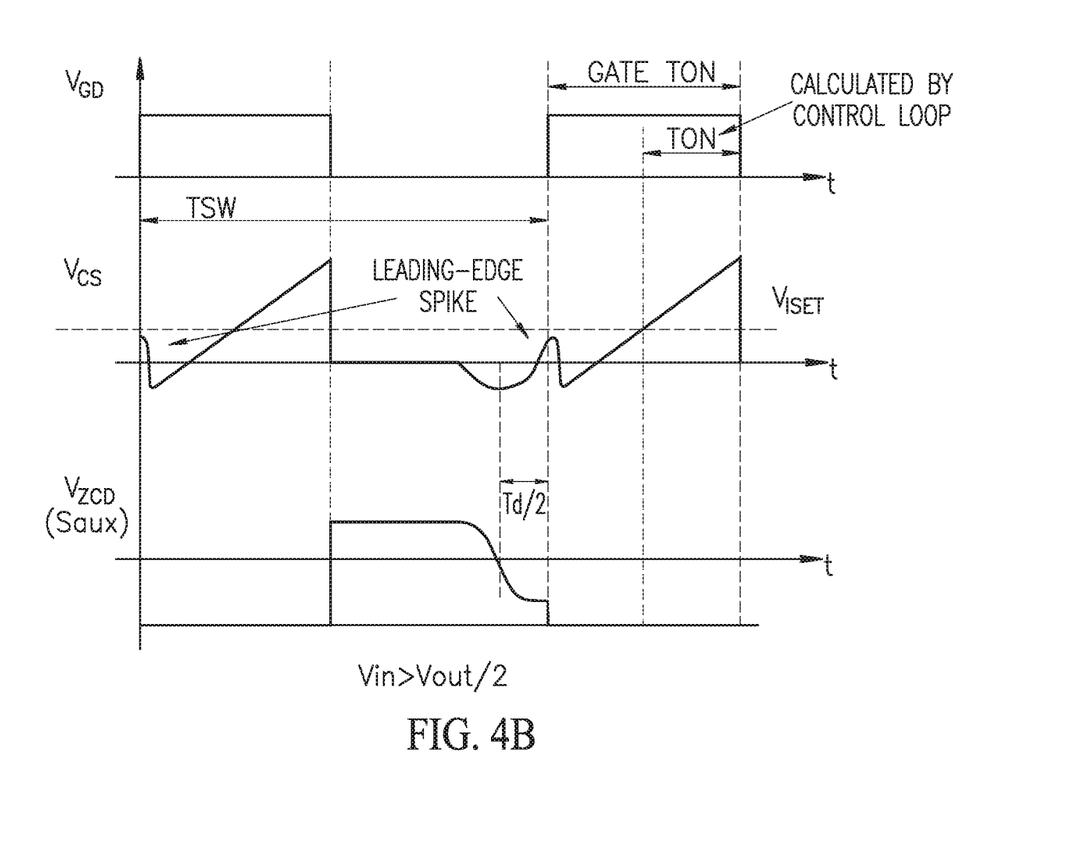
FIG. 4B is a signal timing diagram illustrating signals in the PFC pre-regulator of FIG. 4A during enhanced constant on time control.

The PFC pre-regulator 20 receives an input alternating supply voltage Vac and generates a regulated output voltage Vout at an output node OUTN. The PFC pre-regulator 20 includes a switch M, preferably a MOS power transistor, and a control circuit 101 adapted to control the turn-on time period TON and the off time period TOFF of the switch M at each switching cycle Tsw of the pre-regulator. The control circuit 101 includes a ramp generator including elements Ic, Cc, T1 configured to generate a ramp voltage Srs, and turn-off circuitry having elements 5, 11, 12 configured to determine a final instant of the on period TON of the switch M by comparing the ramp voltage Srs with a first voltage Se. A current detector, preferably a sense resistance Rs, detects a value of a current Ics through the switch M and generates a current sense signal $V_{CS}$ indicating the value of this current. The control circuit 101 includes a synchronizer 50 is configured to synchronize a start Tstart of the ramp voltage Srs with a crossing of the signal Vcs with another signal Vt having a value different from zero, with the switch M being closed. In particular, the synchronization occurs exactly or with a short delay or masking time Tleb, which is described in more detail in U.S. Pat. No. 9,461,558 previously cited and incorporated herein.

A full-wave diode rectifier bridge 2 receives the input voltage Vac, and an input capacitor C1 (which serves as a high frequency filter) has first and second terminals, respectively connected to the diode bridge 2 and to ground GND, with a voltage Vin being developed across the input capacitor and an input current Iin supplied to the input capacitor. An inductor L is connected to a first terminal of the input capacitor C1 and a boost node BN, with the MOS power transistor M having a drain terminal connected to the boost node BN and a source terminal connected through the sense resistance Rs to ground GND. A diode D has an anode connected to the boost node BN and a cathode connected to the output node OUTN, with a first terminal of an output capacitor Co connected to the output node and a second terminal connected to ground GND. The PFC pre-regulator generates the output voltage Vout across the output capacitor Co, with the magnitude of the output voltage being greater than a maximum peak of the input voltage, typically 400 V for systems powered by a European power line or universal power line. The generated output voltage Vout a direct voltage, with some ripple on output voltage, which is, in turn, provided as an input voltage a DC-DC converter (not shown) connected to the PFC pre-regulator 20.

In operation, the control circuit 101 maintains the output voltage Vout at a relatively constant value by means of a feedback control loop formed through the control circuit. The control circuit 101 includes an operating error amplifier 3 adapted configured to compare a divided value of the output voltage Vout, i.e., a voltage Vr given by Vr=R2×Vout/(R2+R1) with a reference voltage Vref, e.g., of the value of 2.5 V, and generates an output error signal Se across an external capacitor Ce connected between an output of the error amplifier 3 and ground GND.

The error signal Se is supplied to an inverting input of a PWM comparator 5 while the signal Srs is supplied to a non-inverting input of the PWM comparator the signal Srs is a voltage ramp across a capacitor Cc charged by a current generator Ic in the time periods wherein the switch T1 is open, which coincide with those when transistor M is on. If the signals Srs and Se are equal, the comparator 5 sends a signal to a control block 6 adapted to control the transistor M and which, in this case, turns it off. Block 6 includes a zero current detecting (ZCD) block 7 having an input receiving the signal Saux from the inductor Laux coupled with the inductor L; the signal Saux is representative of the demagnetization of the core of the transformer formed by the inductances L and Laux. Block 7 is capable of sending an impulse signal to a OR gate 8, the other input of which is connected to a starter 10 adapted to send a signal to the OR gate 8 at the initial instant of time; the output signal S of OR gate 8 is the set input S of a set-reset flip-flop 11 having another input R which is the signal at the output from the comparator 5, and having an output signal Q. The signal Q is sent to the input of a driver 12 which controls the turn-on or turn-off of the transistor M by means of the signal GD.

The synchronizer 50 is adapted to synchronize the triggering of the voltage ramp Srs, used to generate the time period TON, when the value of the inductor current Ics is equal to the signal Vt having a value different from zero, which occurs immediately after or simultaneously with the turn-on of the MOS transistor M. Thereby, the duration of the time period TON will coincide substantially with the duration of the positive ramp Srs. The synchronizer 50 includes a voltage generator 90 that generates the signal Vt and a comparator 61 having a non-inverting input connected to the resistance Rs to receive the signal Vcs and an inverting input connected to receive the signal Vt. The voltage Vt generated by the voltage generator 90 has a fixed voltage value, and is represented as a current threshold voltage $V_{ISET}$ in FIG. 4B. The comparator 61 compares the voltage Vcs from the sense resistance Rs, which is representative of the current Ics through the transistor M, with the signal Vt. The synchronizer 50 further includes a logic circuit, for example a NAND gate 62, which receives an output signal Q from an RS latch 11 and receives an output of the comparator 61 suppled through a delay circuit 63. The delay circuit 63 provides a masking time Tleb. The NAND gate 62 generates an output signal responsive to these received input signals, and provides the output signal to control the closing and opening of switch T1 that is part of the ramp generator that generates the ramp signal Srs.

The delay circuit 63 also receives the signal Q and, for the predetermined time Tleb from the instant when the signal Q goes high, the delay circuit provides a low output signal independent of status of the output from the comparator 61. Once the time Tleb has elapsed, the delay circuit 63 provides the status or level status of the output of the comparator 61 as the output of the delay circuit. The delay circuit 63 is used because when the power transistor M is turned ON, a disturbance or noise flows through the sense resistance Rs and overlaps the useful signal Vcs representing the inductor current $I_L$. Such a disturbance, which occurs as a positive spike called a "leading-edge spike" as illustrated in FIG. 4B, and the use of control circuit 63 is useful to obtain improved immunity against this disturbance, as discussed in more detail in U.S. Pat. No. 9,461,558 referenced above.

The control circuit 101 is typically integrated in a silicon chip or integrated circuit, except the external capacitor Ce which is generally a component outside or "external" to such an integrated circuit.

FIG. 4B is a timing diagram of some signals generated during the operation of the PFC pre-regulator 20 of FIG. 4A. More specifically, FIG. 4B shows the drive voltage $V_{GD}$ generated to drive the power transistor M, the voltage signal Vcs across of the sense resistance Rs, and the zero current detection signal $V_{ZCD}$.

Figure 5:
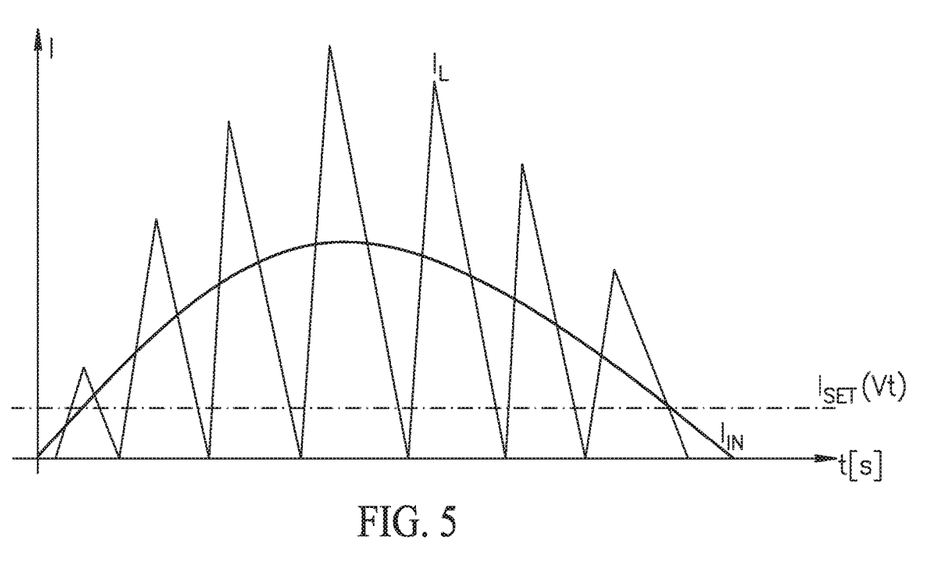
FIG. 5 is a signal diagram showing illustrating a current threshold utilized in the enhanced constant on time control of FIGS. 4A and 4B during a half-cycle of an input current of the PFC pre-regulator.

FIG. 5 is a signal diagram illustrating a current threshold $I_{SET}$ utilized in the enhanced constant on time (eCOT) control of FIGS. 4A and 4B during a half-cycle of an input current Iin of the PFC pre-regulator 20. The current threshold $I_{SET}$ corresponds to the voltage signal Vt generated by the voltage generator 90 in FIG. 4A. As illustrated and described with reference to FIG. 4A, a resonance of the voltage on the boost node BN results due to the parasitic capacitance Cd on this boost node and the inductor L, with this resonance being manifested in the current sense signal $V_{CS}$ and zero current detection voltage $V_{ZCD}$ illustrated in FIG. 3. The parasitic capacitance on the boost node BN is charged at Vout when the ZCD block 7 detects zero current for the inductor current $I_L$, and this capacitance has to be discharged prior to turning ON of the power transistor M for efficient operation, as previously discussed. As a result, the current $I_L$ in the inductor L starts from a negative value $i_{neg}$ instead of zero at turn ON of the power transistor M. This results in a peak value $I_{Lpk}$ (see FIGS. 2A and 2B) of the inductor current IL each switching half cycle that is less than the peak value that would be reached is the inductor current was actually at zero current at turn ON of power switch M, which increases the THD of the PFC pre-regulator 20.

Embodiments of the present disclosure are directed to a control method and circuit that enables total harmonic distortion (THD) of a PFC pre-regulator utilizing valley skipping control to be optimized or reduced, as will now be described in more detail below. In the present description, the PFC pre-regulator is described as being controlled through enhanced constant on time (eCOT) control as described above with reference to FIGS. 4A, 4B and 5, and through valley skipping. This is done by way of example in the present description, and embodiments of the present disclosure are not limited to eCOT control, but may include other control techniques for controlling PFC pre-regulators in combination with valley skipping.

As described above with reference to FIGS. 2A and 2B, in standard constant on time (COT) control the power transistor M is turned ON a delay after the inductor current $I_L$ reaches zero and is turned OFF after a time calculated by the control loop of the PFC pre-regulator, and with turn-off time being constant throughout each half cycle. In eCOT control, the power transistor M is turned ON in the same way as with COT control, but the power transistor is turned OFF after a time calculated by the control loop starting from when the inductor current $I_L$ reaches a calculated current threshold $I_{SET}$ as shown in FIG. 5. In previous approaches of eCOT control, the current threshold $I_{SET}$ has a constant value over each half cycle of the input current $I_{IN}$ as illustrated in FIG. 5. The value of the current threshold $I_{SET}$ may vary from one input half cycle of the input current $I_{IN}$ to another, but within a given input half cycle the current threshold has a constant value. FIG. 5 also shows the increase and decrease of the inductor current $I_L$ each switching cycle of the PFC regulator during the input half cycle of the input current $I_{IN}$.

In embodiments of the present disclosure, instead of maintaining the value of the current threshold $I_{SET}$ constant each input half cycle of the input current $I_{IN}$, the value of the current threshold is adjusted or modulated with each input half cycle based on the number of valleys being skipped through the valley skipping control of the PFC pre-regulator, as will now be described in more detail with reference to FIG. 6. Thus, embodiments of the present disclosure are directed to PFC pre-regulators being controlled in multi-mode operation as previously described, where the term multi-mode operation refers to transition mode TM operation in combination with valley-skipping mode of operation. As mentioned above, the transition mode TM operation is assumed to be eCOT control in the present description, although other types of transition mode TM control in combination with valley-skipping are used in other embodiments of the present disclosure.

Figure 6:
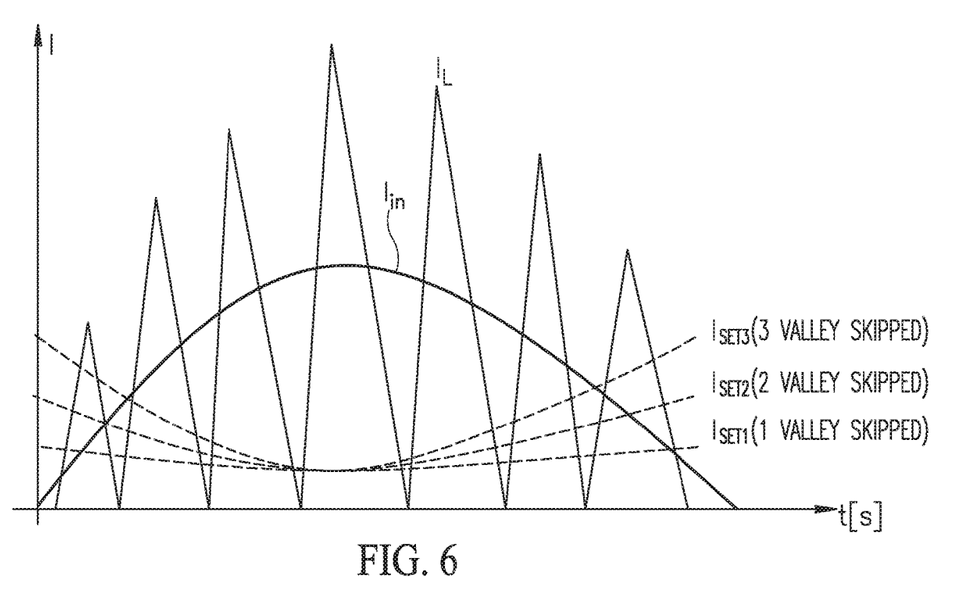
FIG. 6 is a signal diagram illustrating a modulated current threshold utilized in combination with the enhanced constant on time control of FIGS. 4A and 4B and valley skipping during a half-cycle of the input current of the PFC pre-regulator according to an embodiment of the present disclosure.

Referring to FIG. 6, a signal diagram illustrates a modulated current threshold $I_{SET}$ utilized in combination with the eCOT control of FIGS. 4A and 4B during an input half cycle of the input current $I_{IN}$ in a PFC pre-regulator according to an embodiment of the present disclosure. As seen in the figure, the current threshold $I_{SET}$ varies over time, specifically over the time of the input half cycle illustrated. The specific variation or modulation of the current threshold $I_{SET}$ is based on the number of valleys being skipped through the valley skipping mode of operation of the PFC pre-regulator. FIG. 6 illustrates three examples of the modulated current threshold $I_{SET}$: a first modulated current threshold $I_{SET1}$ when the valley skipping mode is skipping one valley of the resonant $V_{ZCD}$ signal; a second modulated current threshold $I_{SET2}$ when the valley skipping mode is skipping two valleys of the resonant $V_{ZCD}$ signal; and a modulated current threshold $I_{SET3}$ when the valley skipping mode is skipping three valleys of the resonant $V_{ZCD}$ signal. Thus, a respective one of the modulated current thresholds $I_{SET1}$, $I_{SET2}$ and $I_{SET3}$ is selected based on the number of valleys being skipped, and the selected threshold varies or is modulated over the time of the input half cycle as illustrated in FIG. 6. The specific values of the modulated current threshold $I_{SET}$ are accordingly a function of the number of valleys being skipped in the valley skipping mode of operation of the PFC pre-regulator.

A control circuit for implementing the modulated current threshold control algorithm of FIG. 6 may be implemented through hardware, software, or a combination of both, and may be integrated in an integrated circuit. Moreover, the hardware may be implemented through analog circuitry or digital circuitry, as will now be described in more detail with reference to FIGS. 7-12. The example embodiments of FIGS. 7-12 are multi-mode embodiments that include one, two and three valley-skipping modes of operation. Other embodiments of the present disclosure includes valley-skipping modes for skipping a larger number of valleys, with the current threshold $I_{SET}$ having a respective function over the input half cycle for each such valley-skipping mode.

Figure 7:
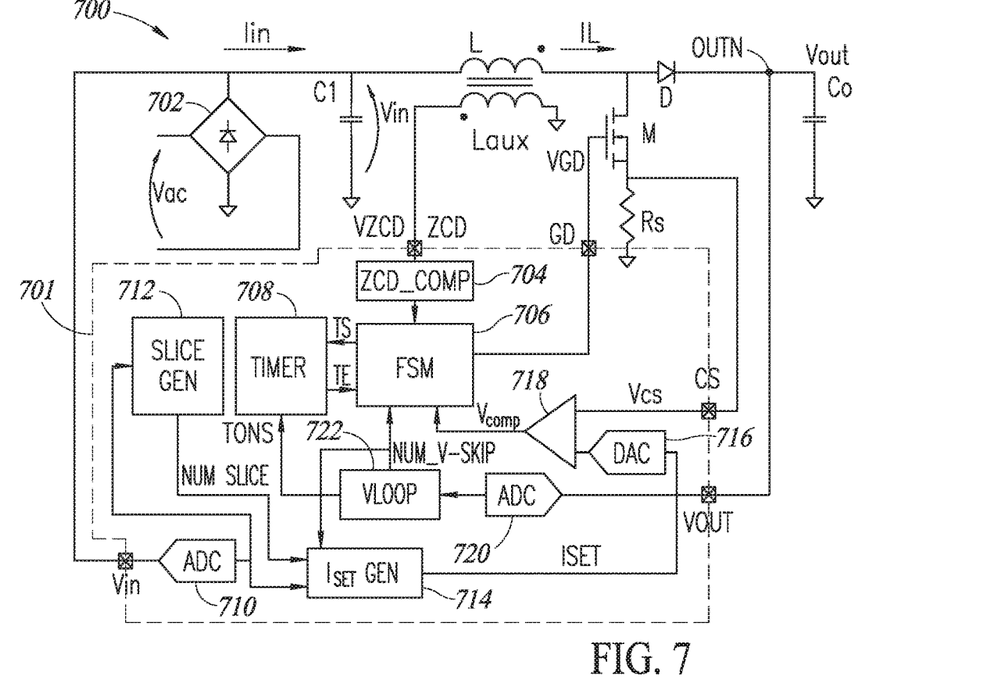
FIG. 7 is a functional block and schematic diagram of a digital power factor correction control circuit for implementing the modulated current threshold control of FIG. 6 according to an embodiment of the present disclosure.

FIG. 7 shows a PFC pre-regulator 700 including a control circuit 701 for implementing the modulated current control algorithm of FIG. 6 according to one embodiment of the present disclosure. Components of the PFC pre-regulator 700 that are the same as those previously described above with reference to FIG. 1 or 4A will not again be described in detail, but will only be discussed as required for the description of the control circuit 701. The PFC pre-regulator 700 includes a rectifier 702 configured to rectify the input voltage Vac and provide the input current Iin to generate an input voltage Vin across an input capacitor C1. A ZCD comparator 704 detects a zero current of the inductor current IL via the auxiliary winding Laux (i.e., zero voltage across Laux) and generates an active ZCD output signal in response to detecting such a zero current condition. An event driven finite state machine (FSM) 706 receives the output signal from the ZCD comparator 704 and controls the turning ON and OFF of the power transistor M based on this output signal and other signals, as will be described in more detail below. A timer 708 generates timing control signals including a count that times the turn-on time TON of the power transistor M. The timer 708 generates this count for timing the turn-on time TON based on a timer start signal TS from the FSM 706 and a turn-on time signal TONS from voltage control loop circuitry 722 that sets the value of the turn-on time ON, as will also be described in more detail below. The timer 708 also generates a timer end signal TE that is supplied to FSM 706 to indicate the generated count has a value indicating the turn-on time TON has been reached, and in this way that the timer has timed the turn-on time TON.

Figure 8:
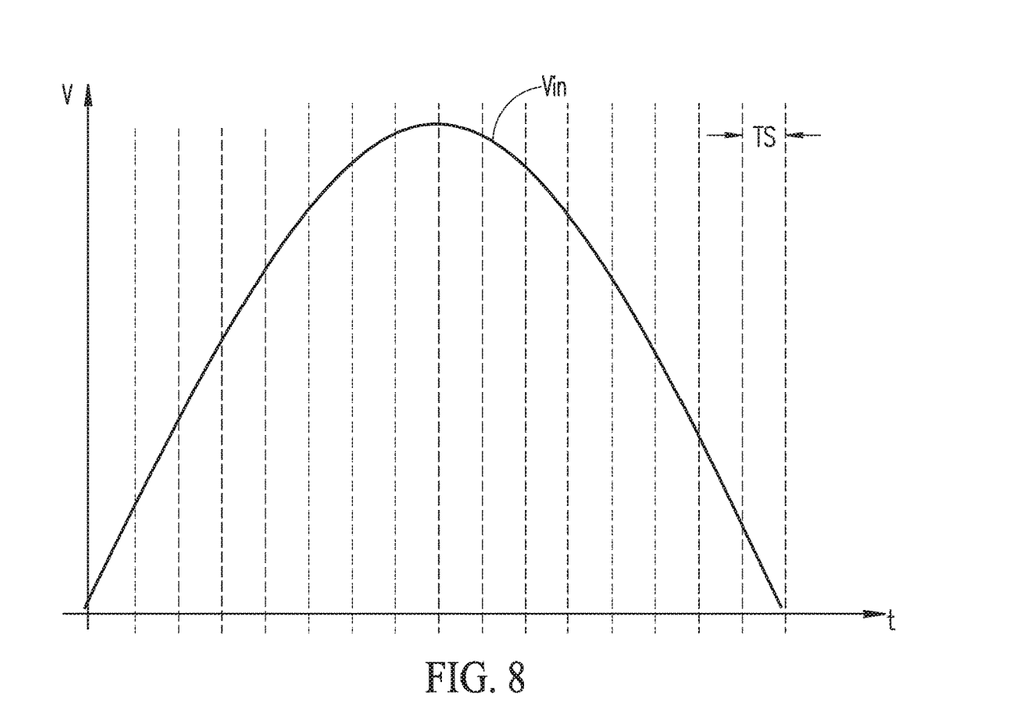
FIG. 8 is a signal diagram illustrating the operation of a slice generator of FIG. 7 according to one embodiment of the present disclosure.

An analog-to-digital converter (ADC) 710 receives the input voltage Vin and from this analog input voltage generates a corresponding digitized input voltage, which is supplied to a slice generator 712 and current threshold generator 714. The slice generator 712 divides the half cycle of the input voltage Vin into discrete equal slices of time TS, as is illustrated in FIG. 8. The half cycle is divided into N segments or slices of time TS, with the slice generator assigning each of the N slices of time TS a number to identify the slice of time in the half cycle. In response to the digital value of the input voltage Vin from the ADC 710, the slice generator 712 provides a slice number parameter NUM_SLICE of the current slice of time TS to the current threshold generator 714. The current threshold generator 714 then generates the instant digital value of the current threshold $I_{SET}$ to be utilized by the control circuit 700. This digital current threshold $I_{SET}$ from the generator 714 is supplied to a digital-to-analog converter (DAC) 716, which converts the digital current threshold into a corresponding analog voltage representing the digital current threshold, and this analog voltage is supplied to a first input of a current sensing comparator 718. A second input of the current sensing comparator 718 receives the current sense signal $V_{CS}$ generated across the sense resistor Rs. The current sensing comparator 718 generates a comparison signal $V_{comp}$ that goes active in response to the current sense signal $V_{CS}$ reaching the analog voltage, which corresponds to the current threshold $I_{SET}$, from the DAC 716. In operation, the current threshold generator 714 generates the digital current threshold $I_{SET}$ based on slice number parameter NUM_SLICE from the slice generator 712 and on a number of valleys to be skipped parameter NUM_V-SKIP provided by the voltage control loop circuitry 722. The NUM_SLICE parameter indicates the current phase of the digitized input voltage Vin such that the digital current threshold $I_{SET}$ generated by the current threshold generator 714 is a function of this phase and the current digitized value of the input voltage Vin (from ADC 710), namely $I_{SET}$=f(NUM_SLICE, Vin).

An ADC 720 digitizes the output voltage Vout and provides this digitized output voltage to the current threshold generator 714 and to the voltage control loop circuitry 722, which generates the turn-on time signal TONS indicating the turn-on time TON for the switch M and also generates a number of valleys to be skipped parameter NUM_V-SKIP that is supplied to the current threshold generator and the FSM 706. The current threshold generator 714 modulates the current threshold $I_{SET}$ based on the NUM_SLICE parameter received from the slice generator 712, the NUM_V-SKIP parameter received from the voltage control loop circuitry 722, and the digitized input voltage Vin as received from the ADC 710.

In operation of the control circuit 701, the ZCD comparator 704 senses, via the voltage across auxiliary inductor Laux, a zero current crossing of the current $I_L$ through the inductor L and generates an active output signal in response to detecting such a zero current crossing. The FSM 706 thereafter activates the $V_{GD}$ signal to turn ON (i.e., close) or activate the power transistor M in response to receiving the active output signal from the ZCD comparator 704 indicating a zero current crossing of the current $I_L$. The current sense comparator 718 receives the present the current threshold $I_{SET}$ from the DAC 716 and compares this current threshold to the current $I_L$ through the turned ON power transistor M, where the current sense signal $V_{CS}$ indicates the current $I_L$. The current sense comparator 718 activates the $V_{comp}$ signal in response to the $V_{CS}$ signal reaching the current threshold $I_{SET}$, meaning the current $I_L$ has reached the current threshold. In response to receiving the active $V_{comp}$ signal from the current sense comparator 718, the FSM 706 activates the timer start signal TS, causing the timer 708 to begin counting the turn-on time period TON of the power transistor M.

Upon the count generated by the timer 708 reaching the value indicating the timer has timed the turn-on time period TON, the timer activates the timer end signal TE. In response to receiving the active timer end signal TE, the FSM 706 deactivates the $V_{GD}$ signal to turn OFF (i.e., open) or deactivate the power transistor M. Upon the ZCD comparator 704 detecting the next zero current crossing of the current $I_L$, the FSM again activates the $V_{GD}$ signal to turn ON the power transistor M and start the next switching cycle of the PFC pre-regulator 700. The FSM 706 operates to synchronize starting of the timer 708 with the $V_{CS}$ signal reaching the current threshold $I_{SET}$, where the $V_{CS}$ signal indicates the current $I_L$ through inductor L when the power transistor M is turned ON. Thus, in response to the $V_{comp}$ going active when the current $I_L$ through inductor L reaches the current threshold $I_{SET}$, the FSM 706 activates the TS signal to thereby start the timer 708 timing the turn-on time TON. In this way, the FSM 706 synchronize the start of the timer 708 to time the TON time with the current $I_L$ through inductor L reaching the current threshold $I_{SET}$.

In FIG. 7, the control circuit 701 is shown as including an input voltage node Vin represented by an "X" in square in the figure. The control circuit 701 similarly includes a zero current detection node ZCD, a gate drive node GD, a current sense node CS, and an output voltage node VOUT. The control circuit 701 would typically be formed in a chip or integrated circuit, and these nodes represent interconnection pins of such an integrated circuit. The various components of the control circuit 701 may be formed through different types of suitable digital circuitry, such as suitable software or firmware executing on a microcontroller and along with memory (not shown in FIG. 7) for storing this software or firmware. Furthermore, in the present description the PFC pre-regulator 700 may be described as including "switching circuitry," where this switching circuitry includes all or some of the rectifier 702, input capacitor C1, coupled inductors L and auxiliary inductor Laux, power transistor M, sense resistor $R_S$, diode D, output node OUTN, and output capacitor Co.

Figure 9:
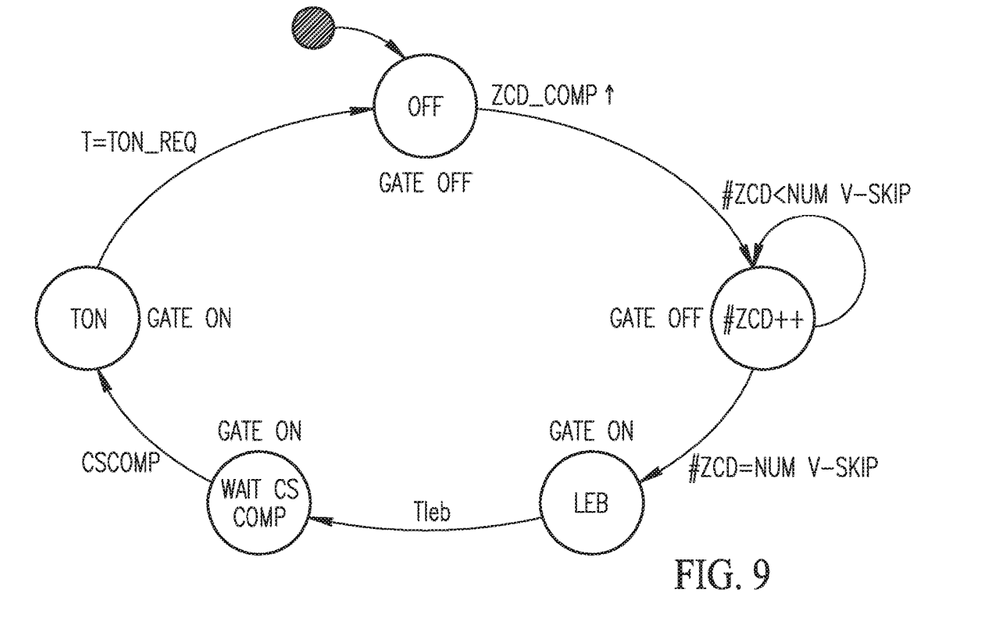
FIG. 9 is state diagram illustrating the operation of the finite state machine of FIG. 6 according to one embodiment of the present disclosure.

FIG. 9 is a state diagram illustrating the operation of the FSM 706 of FIG. 7 according to one embodiment of the present disclosure. The OFF state in the top center of the diagram illustrates the state in which the power transistor M is turned OFF, namely the gate drive signal VGD being inactive. Starting from the OFF state, in response to the ZCD comparator 704 detecting a zero current condition (voltage of Laux is zero), the FSM 706 proceeds to the state #ZCD++ on the right and waits for the proper number of valleys to be skipped, as given by the NUM_V-SKIP parameter from the voltage control loop circuitry 722. The parameter #ZCD in this state is a valley-skip count that the FSM 706 generates and compares to the NUM_V-SKIP parameter. As long as (#ZCD<NUM_V-SKIP), the FSM 706 remains in this state and thereby skips the desired number of valleys, as discussed above. When the #ZCD count is equal to the number of valleys to be skipped parameter NUM_V-SKIP (#ZCD=NUM_V-SKIP), the FSM 706 proceeds to the LEB state and turns ON the power transistor M by activating the $V_{GD}$ signal. Once the FSM 706 has delayed the masking time Tleb, which was discussed above in relation to FIGS. 4A and 4B, the FSM transitions from the LEB state to a WAIT_CS_COMP state and waits in this state until the current $I_L$ reaches the current threshold $I_{SET}$ as set by the current threshold generator 714, which is indicated by the current sense comparator 718 driving its output active. In FIG. 9, the comparison signal $V_{comp}$ output of the current sense comparator 718 being at an active level is represented as CSCOMP. For example, upon the $V_{CS}$ signal reaching the current threshold $I_{SET}$, the current sense comparator 718 drives the $V_{comp}$ signal to an active level (e.g., a high level). After the required number of valleys have been skipped through the #ZCD++ state and the masking time Tleb delayed in the LEB state, the FSM 706 transitions from the WAIT_CS_COMP state to a TON state in response to the $V_{comp}$ signal from the current sense comparator 718 being at an active level), which indicates the current $I_L$ has reached the current threshold $I_{SET}$ The $V_{comp}$ signal being at an active level is represented as CSCOMP in FIG. 9. When the $V_{comp}$ signal is at an active high level, the FSM 706 evolves or transitions from the WAIT_CS_COMP state to the TON state, and otherwise the FSM remains in the WAIT_CS_COMP state if the $V_{comp}$ signal is inactive low level. The active level of the $V_{comp}$ signal could be a high level or a low level, as will be appreciated by those skilled in the art. In operation of the FSM 706, if the $V_{comp}$ signal from the current sense comparator 718 is driven to the active level during the LEB state, then the FSM will enter the WAIT_CS_COMP state and transition immediately from the WAIT_CS_COMP state to the TON state. After the FSM 706 transitions from the WAIT_CS_COMP state to the TON state, the FSM activates the timer start signal TS (FIG. 7) to start the timing of the turn-on time period TON of the power switch M. The power transistor M remains turned ON for the required turn-on time TON_REQ, and upon being turned ON for this time the FSM 706 once again turns OFF the transistor (deactivates the $V_{GD}$ signal) and the state of the FSM returns to the OFF state in top center of FIG. 9, and once again awaits the ZCD comparator 704 detecting a zero current condition of the inductor current $I_L$.

Figure 10:
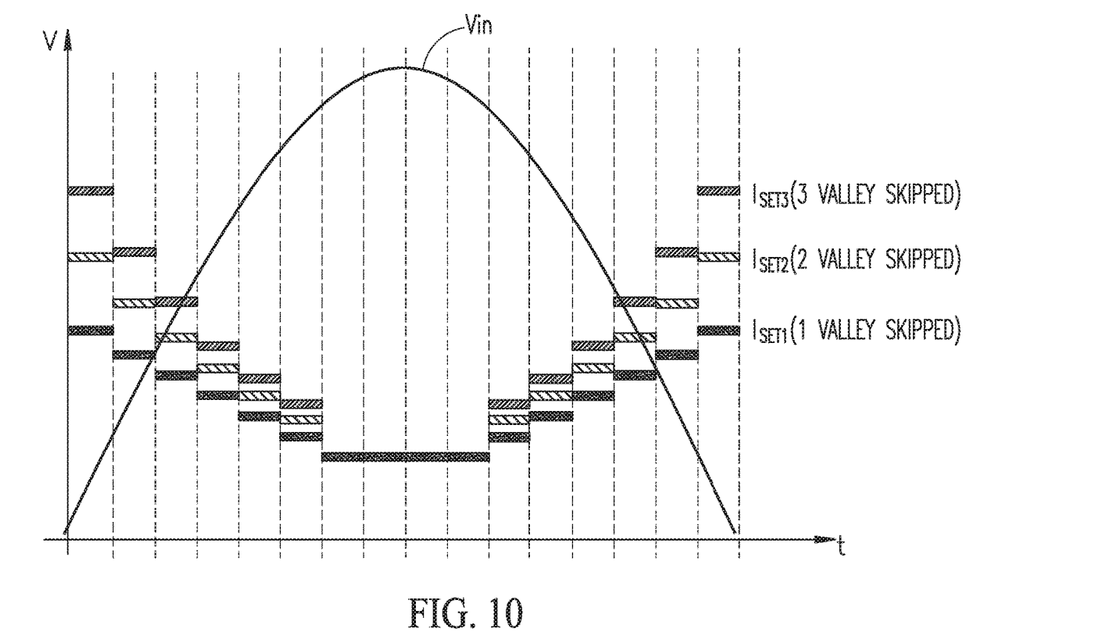
FIG. 10 is a signal diagram illustrating the modulation of the current threshold for one, two and three valleys being skipped for the digital power factor correction control circuit of FIG. 7.

FIG. 10 is a graph showing the values of the current threshold $I_{SET}$ shows resulting operation of the control circuit 701 over an input half cycle of the input voltage Vin in generating the respective values of the current threshold in each of the slices of time TS in the input half cycle. The values of the current threshold $I_{SET}$ are a function of the number of valleys skipped as previously discussed and thus three different sets of values for the current threshold $I_{SET}$ or shown as current threshold $I_{SET1}$ for one valley skipped, current threshold $I_{SET2}$ for two valleys skipped, and current threshold $I_{SET3}$ for three valleys skipped.

Figure 11:
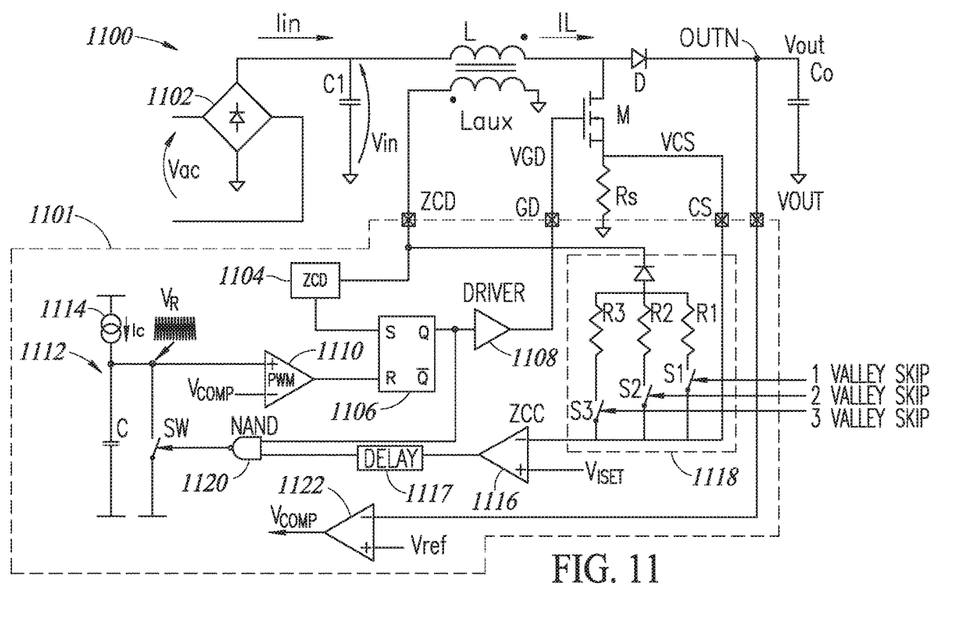
FIG. 11 is a functional block and schematic diagram of an analog power factor correction control circuit for implementing the modulated current threshold control of FIG. 6 according to a further embodiment of the present disclosure.

FIG. 11 is a schematic diagram of a PFC pre-regulator 1100 including an analog control circuit 1101 for effectively implementing the modulated current threshold $I_{SET}$ as a function of the number of valleys skipped according to another embodiment of the present disclosure. The components 1104-1122 of the control circuit 1101 that are the same as or similar to the corresponding components described above, such as with reference to FIG. 4A, will not again be described in detail with reference to FIG. 11. The control circuit 110 includes a current threshold generator 1118 including a plurality of series-connected resistors R1-R3 and switches S1-S3 coupled on one end the through a diode to a ZCD node on which the zero current detection signal $V_{ZCD}$ is generated and coupled on the other end to a CS node on which the current sense signal $V_{CS}$ is generated. The CS node is also coupled to the non-inverting input of the current sensing comparator 1116.

The switches S1-S3 are controlled so that one of the switches is activated (i.e., closed), with the closed switch corresponding to the valley-skipping mode currently being implemented. Thus, where one valley is being skipped, switch S1 is closed while switches S2 and S3 are open. Where two valleys are being skipped the switch S2 is closed and switches S1 and S3 are open, while when three valleys are being skipped the switch S3 is closed and switches S1 and S2 are open. The current threshold generator 1118 of FIG. 11 effectively provides variation of the current threshold $I_{SET}$ over the input half cycle as shown in FIG. 6, with the switch S1-S3 activated and corresponding value of the resistor R1-R3 adjusting the value of the current sensed signal $V_{CS}$ based on the number of valleys being skipped. In this way, the current threshold generator 1118 adds a voltage to the current sense signal $V_{CS}$ that is function of the input half cycle and number of valleys being skipped. Circuitry in the control circuit 1101 generates 1VALLEY_SKIP, 2VALLEY_SKIP, and 3VALLEY_SKIP signals to control the switches S1-S3.

Figure 12:
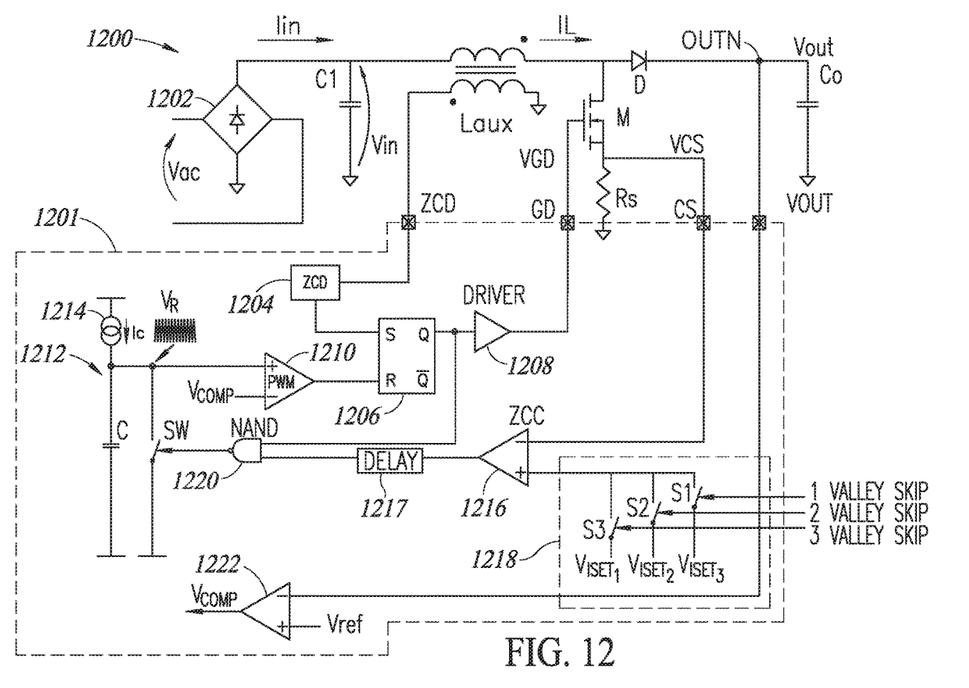
FIG. 12 is functional block and schematic diagram of another embodiment of an analog power factor correction control circuit for implementing the modulated current threshold control of FIG. 6.

FIG. 12 is a schematic diagram of a PFC pre-regulator 1200 including an analog control circuit 1201 for implementing the modulated current threshold $I_{SET}$ as a function of the number of valleys skipped according to another embodiment of the present disclosure. The components 1204-1222 of the control circuit 1201 that are the same as or similar to the corresponding components described above, such as with reference to FIG. 4A, will not again be described in detail with reference to FIG. 12. The control circuit 1201 includes a current threshold generator 1218 that includes a plurality of switches S1, S2 and S3 coupled in parallel between respective nodes receiving respective current threshold voltages $V_{ISET1}$, $V_{ISET2}$, and $V_{ISET3}$. One of the switches S1-S3 is activated, with the activated switch being based on the number of valleys being skipped in the valley skipping mode of operation of the PFC pre-regulator 1200. Switch S1 is activated (closed) when one valley is being skipped while switches S2 and S3 are inactive (i.e., open). Switch S2 is activated when two valleys are being skipped while switches S1 and S3 are inactive, and switch S3 is activated when three valleys are being skipped while switches S1 and S2 are inactive. Circuitry in the control circuit 1201 generates 1VALLEY_SKIP, 2VALLEY_SKIP, and 3VALLEY_SKIP signals to control the switches S1-S3.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control circuit configured to control a power factor correction (PFC) pre-regulator including a power switch and being configured to operate in a transition mode of operation and a valley-skipping mode of operation, the control circuit configured to generate a drive signal to control a switching of the power switch based on a current threshold, and the control circuit including a current threshold generator configured to modulate the current threshold within each half cycle of an input supply voltage as a function of a number of valleys skipped in the valley-skipping mode of operation,
wherein the PFC pre-regulator is configured to receive the input supply voltage and wherein the control circuit further comprises a slice generator configured to divide a half cycle of the input supply voltage into equal slices of time and to assign a number to each of the slices of time, and wherein the current threshold generator receives the number of a current slice of time from the slice generator and is further configured to modulate the current threshold based on the number of the current slice of time, and
wherein the control circuit further comprises a finite state machine configured to generate the drive signal to control the switching off and on of the power switch.

2. The control circuit of claim 1, wherein the transition mode of operation is an enhanced constant on time control of the PFC pre-regulator.

3. The control circuit of claim 1, wherein the number of valleys skipped in the valley-skipping mode of operation is one of one valley skipping, two valley skipping, three valley skipping, and four or more valley skipping.

4. The control circuit of claim 1,
wherein the PFC pre-regulator includes an inductive element coupled to the power switch;
wherein the control circuit includes:
a current sensing comparator including a first input coupled to a current sense node to receive a current sense signal indicating a current through the inductive element and a second input coupled to the current threshold generator to receive the current threshold; and
a zero current detection node configured to provide a signal indicating a zero current condition of the current through the inductive element; and
wherein the current threshold generator includes:
a diode having a cathode coupled to the zero current detection node; and
a plurality of switches and a plurality of resistors, each of the plurality of switches being coupled in series with a respective one of the plurality of resistors between an anode of the diode and the current sense node, wherein one of the plurality of switches is activated based on the number of valleys skipped.

5. The control circuit of claim 1,
wherein the PFC pre-regulator includes an inductive element coupled to the power switch;
wherein the control circuit includes:
a current sensing comparator including a first input coupled to a current sense node to receive a current sense signal indicating a current through the inductive element and including a second input coupled to the current threshold generator to receive the current threshold; and wherein the current threshold generator includes:
a plurality of current threshold voltage nodes, each current threshold voltage node configured to receive a respective current threshold voltage; and
a plurality of switches, each of the plurality of switches coupled between a corresponding one of the plurality of current threshold voltage nodes and the second input, wherein one of the plurality of switches is activated based on the number of valleys skipped.

6. The control circuit of claim 1, wherein the PFC pre-regulator has a boost topology.

7. The control circuit of claim 1, wherein the control circuit further comprises pulse width modulation circuitry configured to control the switching of the power switch.

8. The control circuit of claim 1, wherein the power switch comprises a MOS power transistor.

9. The control circuit of claim 1, wherein the control circuit includes a resistor network including a plurality of parallel coupled resistors configured to generate a plurality of voltages, each of the plurality of voltages corresponding to a respective value of the modulated current threshold.

10. A method, comprising:
generating a drive signal to control switching of a power switch in a power factor correction (PFC) pre-regulator to operate the PFC pre-regulator in a transition mode of operation and a valley-skipping mode of operation;
generating a current threshold based on a value and phase of an input voltage supplied to the PFC pre-regulator;
modulating, by a current threshold generator, the current threshold within each half cycle of the input voltage as a function of a number of valleys skipped in the valley-skipping mode of operation; and
generating the drive signal to control the switching of the power switch based on the current threshold,
wherein the PFC pre-regulator is configured to receive the input supply voltage and wherein modulating the current threshold comprises
dividing, by a slice generator, a half cycle of the input supply voltage into equal slices of time;
assigning a number to each of the slices of time;
receiving, by the current threshold generator, the number of a current slice of time from the slice generator; and
modulating the current threshold based on the number of the current slice of time, and
wherein generating the drive signal includes, generating, by a finite state machine, the drive signal to control the switching off and on of the power switch.

11. The method of claim 10, wherein the PFC pre-regulator includes an inductive element coupled to the power switch and wherein generating the drive signal comprises comparing a current through the inductive element to the current threshold.

12. The method of claim 11, further comprising starting a timing of a turn-on time of the power switch in response to the current through the inductive element reaching the current threshold.

13. The method of claim 12, wherein starting the timing of the turn-on time of the power switch comprises activating a digital timer to generate a count indicating a duration for which the power switch has been turned on.

14. The method of claim 10, wherein the transition mode of operation is an enhanced constant on time control mode of operation of the PFC pre-regulator.

15. A power factor correction pre-regulator, comprising:
switching circuitry including an inductive element coupled to a switching element configured to receive a drive signal to control switching of the switching element, the switching circuitry configured to receive an alternating input voltage and configured to generate an output voltage from the alternating input voltage in response to the drive signal; and
a control circuit coupled to the switching circuitry, the control circuit configured to generate the drive signal to control the switching in a transition mode of operation and a valley-skipping mode of operation, and the control circuit further configured to generate the drive signal based on a current threshold, and to modulate the current threshold within each half cycle of the input voltage as a function of a number of valleys skipped in the valley-skipping mode of operation,
wherein the control circuit includes a resistor network including a plurality of parallel coupled resistors configured to generate a plurality of voltages, each of the plurality of voltages corresponding to a respective value of the modulated current threshold.

16. The power factor correction pre-regulator of claim 15, wherein the switching circuitry has a boost topology.

17. The power factor correction pre-regulator of claim 15, wherein the control circuit is configured to compare a current through the inductive element to a current value of the modulated current threshold, and to generate the drive signal to turn on the switching element responsive to the current through the inductive element reaching the current value of the modulate current threshold.

18. The power factor correction pre-regulator of claim 15, wherein the control circuit further comprises a slice generator configured to divide a half cycle of the input voltage into equal slices of time and to assign a number to each of the slices of time, and to modulate the current threshold based on the number of a current slice of time.

19. The power factor correction pre-regulator of claim 18, wherein the control circuit further comprises a finite state machine configured to generate the drive signal to control the switching off and on of the power switch.

20. A method, comprising:
generating a drive signal to control switching of a power switch in a power factor correction (PFC) pre-regulator to operate the PFC pre-regulator in a transition mode of operation and a valley-skipping mode of operation;
generating a current threshold based on a value and phase of an input voltage supplied to the PFC pre-regulator;
modulating the current threshold within each half cycle of the input voltage as a function of a number of valleys skipped in the valley-skipping mode of operation;
generating the drive signal to control the switching of the power switch based on the current threshold; and
generating, by a resistor network including a plurality of parallel coupled resistors, a plurality of voltages, each of the plurality of voltages corresponding to a respective value of the modulated current threshold.

* * * * *